Oct. 20, 1936.  A. S. CHESTON  2,057,709
SLIDING SEAT GUIDE
Filed Oct. 6, 1934  2 Sheets-Sheet 1
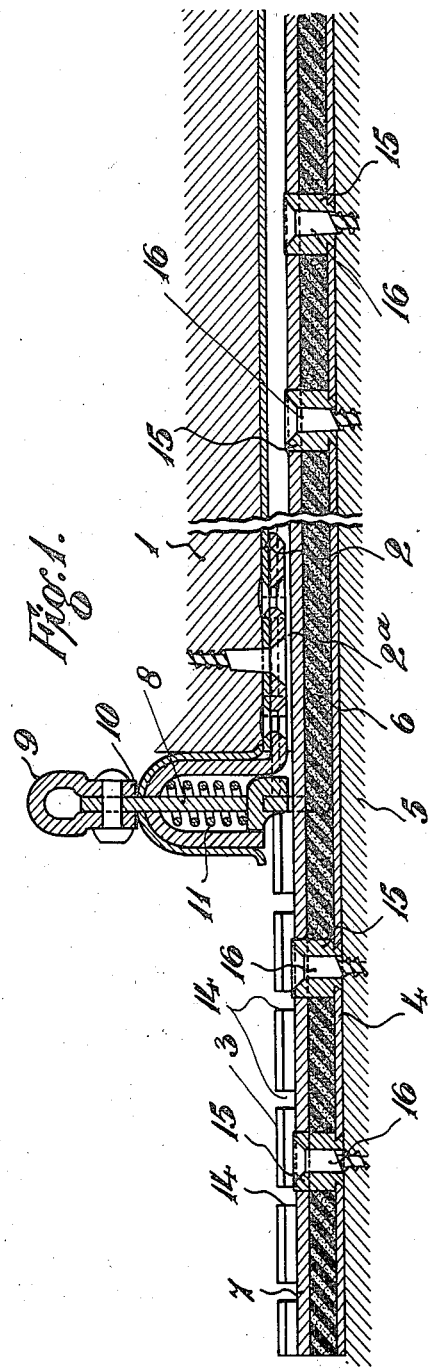
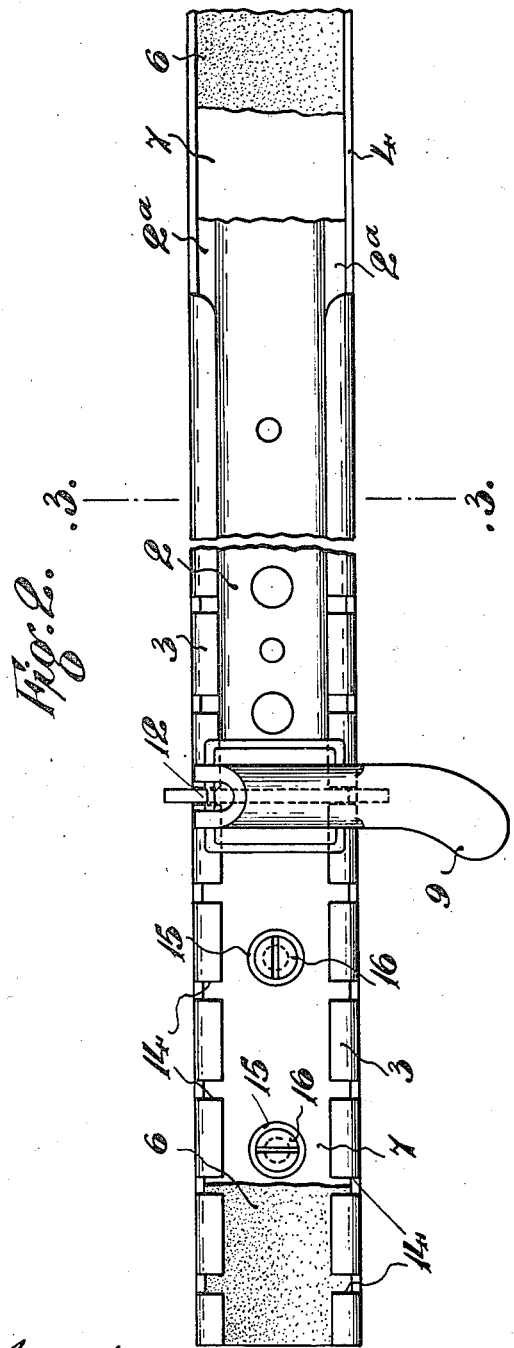
Inventor ARTHUR S. CHESTON
By Richards & Geier
Attorneys Oct. 20, 1936.  A. S. CHESTON  2,057,709
SLIDING SEAT GUIDE
Filed Oct. 6, 1934   2 Sheets-Sheet 2
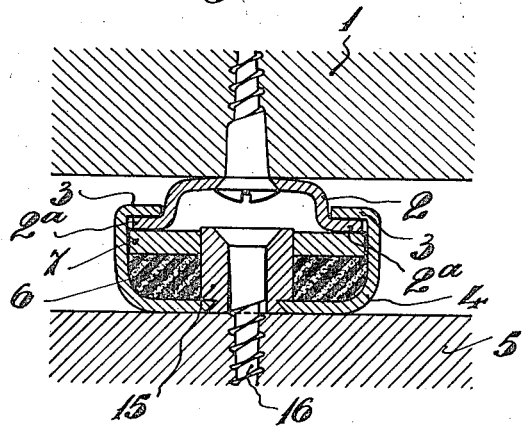
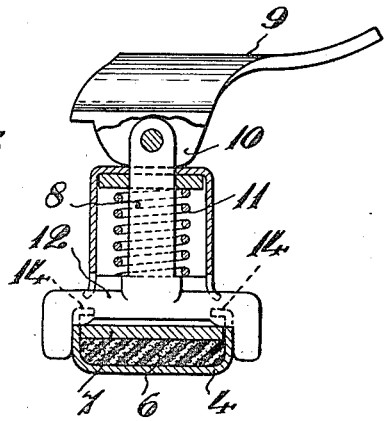
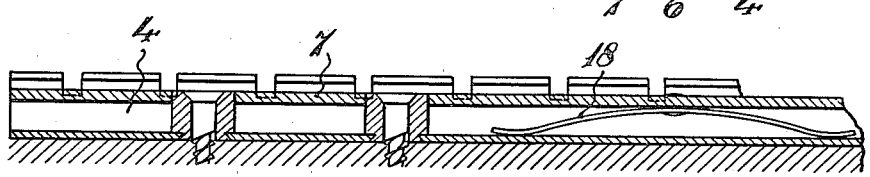
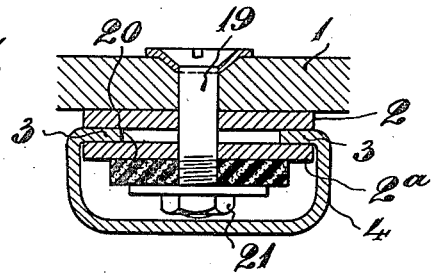
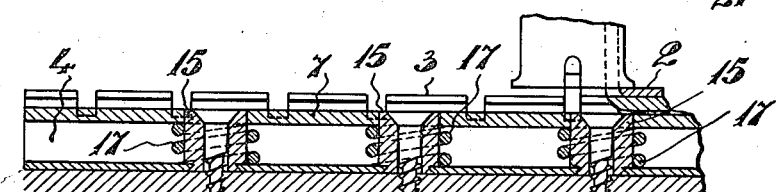
Inventor ARTHUR S. CHESTON
By Richards & Geier
Attorneys Patented Oct. 20, 1936

2,057,709

UNITED STATES PATENT OFFICE 2,057,709

SLIDING-SEAT GUIDE

Arthur Sam Cheston, Birmingham, England

Application October 6, 1934, Serial No. 747,176
In Great Britain October 26, 1933

6 Claims. (Cl. 155—14)

This invention relates to sliding seats, particularly for motor vehicles, and of that kind which are mounted on, or fixed to, bars or runners engaging and movable within or upon relatively fixed guides, so as to permit of the seat being adjusted to the most suitable position, or moved out of the way to give easy ingress and egress to and from the vehicle. The object of the invention is to provide, in connection with seat guiding means of this kind, improved means whereby looseness or play between the sliding parts of the seat fitting is effectively avoided or reduced to a minimum, and which, at the same time, permits of a free sliding movement and enables the seat to be easily adjusted without jamming, besides rendering the seat self-retaining in its adjusted position.

According to this invention, the sliding seat is provided with guiding means comprising a non-rotatable bar or runner which is held or pressed against a co-operating guide part by spring or resilient means, and according to the preferred arrangement the edges of the seat runner or bar are pressed up beneath flanges on a fixed guide channel by a strip of rubber laid within the latter, with a metal bearer-bar interposed between the rubber and the said seat runner or bar.

Figure 1 of the accompanying drawings represents a longitudinal section through a motor vehicle seat runner fitting constructed in accordance with this invention, in which the seat runner and the flanges of the guide channel are pressed into engagement by a rubber strip housed within the channel.

Figure 2 is a plan view of same, partly broken away.

Figure 3 represents a cross-section on the line 3—3, Figure 2, on a larger scale.

Figure 4 is a sectional view of the locking device which may be employed.

Figure 5 illustrates a modified arrangement in which coiled springs are employed instead of rubber.

Figure 6 shows another arrangement in which blade springs are used.

Figure 7 illustrates a still further arrangement.

Referring to Figures 1 to 4 of the drawings, the bottom 1 of the sliding seat is provided at each side with a runner-bar 2 having set-down longitudinal flanges 2a which are slidably engaged beneath inwardly-bent longitudinal flanges 3 at the upper edges of a metal guide channel 4 fixed to the floor 5 of the vehicle. The arrangement is such that the seat may be freely moved along the guide channels into the position desired, whilst in order to take up looseness or play between the relatively sliding parts, there is fitted along the bottom of each guide channel 4 a strip of soft spongy rubber 6 which extends for the full length and width of the said channel, whilst superimposed upon this rubber strip 6, which is of a considerable thickness, is a flat metal bearer-bar 7 which likewise extends for the full length and width of the channel. This bearer-bar 7 fits closely between the rubber 6 and the undersides of the set-down flanges 2a of the runner-bar 2 which is fixed to the underside of the seat, and the arrangement is such that the rubber 6 is slightly compressed throughout its length, so that the said flanges 2a of the runner-bar are pressed up closely against the overhanging flanges 3 of the fixed guide channel 4. The rubber 6 owing to its spongy nature is exceedingly resilient and exerts a steady upward pressure on the runner-bar 2, through the bearer-bar 7, which is sufficient effectively to prevent any chatter or play between the co-operating flanges 2a and 3 of the runner-bar and guide channel, when the vehicle is in motion and particularly when the seat is unoccupied. On the other hand, this upward pressure is not sufficient to interfere with the sliding action of the seat, but owing to the co-operating flanges 2a and 3 being pressed into engagement by the rubber 6 the sliding action is smoother and the seat is not liable to stick owing to the runner-bars 2 jamming within their guides. The improved arrangement is simple and efficient in construction, and there is, moreover, nothing to get out of order, whilst owing to the provision of the metal bar 7 above the rubber the latter is not subjected to any wear. When the seat is occupied the rubber is compressed and the seat is free to be adjusted to any desired position. Preferably means are provided for positively locking the seat in such adjusted position. Such means may be of any suitable construction, and may for example, comprise a bolt 8 (Figure 4) jointed to a lever 9 having a cam-end 10 bearing on a fixed support, so that the bolt 8 may be raised up into an inoperative position against the action of a spring 11. The bolt which is carried by the seat, has a cross-bar 12 at its lower end, which, when the bolt is released, engages notches 14 in the edges of the guide channel 4, thus fixing the seat in position.

Each guide channel is adapted to be secured to the vehicle floor by screws, and to avoid the necessity of having to remove the rubber strip 6, and the engaging bearer-bar 7 from the channel 4 before the latter can be fixed in position, the bottom of the said channel 4 is provided with suitably positioned holes within which are fitted short vertical open-ended bushes or sleeves 15 adapted to receive the fixing screws 16. These sleeves 15 project through holes in the rubber 6 and fit within holes in the bearer-bar 7, so that the latter, whilst capable of being pressed upwards by the rubber 6, is prevented from moving endwise. The arrangement enables the channel member 4 to be easily fixed without disturbing the parts in any way.

The rubber strip which is fitted within the channel 4 may be of any suitable thickness, whilst instead of a rubber strip extending throughout the length of the channel being provided a series of rubber pads, of any suitable size and shape, may be spaced along the bottom of the channel, so as to keep the flanges on the seat runner pressed up against the flanges of the fixed channel.

Springs may be used instead of pieces of rubber or rubber strips, if desired. Thus, in the arrangement shown in Figure 5 a series of coiled springs 17 are provided between the bottom of the channel 4 and the bearer bar 7, so as to move the latter upwards and press the edges of the runner-bar 2 on the seat up against the flanges 3 on the guide channel. The springs 17 may, as shown, conveniently surround the sleeve or bushes 15 through which the fixing screws pass. Instead of coiled springs a series of blade springs 18 may be provided and arranged, as shown in Figure 6, between the bottom of the channel 4 and the bearer bar 7, so that the latter is pressed up against the seat-runner.

If desired, any of the arrangements described may obviously be reversed and the channel member housing the rubber or springs inverted and fixed to the underside of the seat to engage flanges on a bar fixed to the vehicle floor.

A further construction which may be employed is illustrated in Figure 7 of the drawings. In this arrangement the inturned flanges 3 of the fixed channel member 4 are engaged between a pair of runner bars 2 and 2ª carried by the seat, the said bars being connected together by a series of bolts or screw-pins, such as 19, extending through the seat bottom 1. The lower bar 2ª is free to move upon the bolts or screw-pins and is pressed upwards into engagement with the flanges 3 of the fixed channel by a plurality of rubber washers, such as 20, threaded over the bolts. The lower end of each bolt or screw-pin is fitted with a nut 21 engaging beneath the rubber washer and fixed against rotation, and by turning the bolts or screw-pins from the upper side of the seat the pressure exerted by the rubber washers may be adjusted, the arrangement being such that the rubber washers serve to press the runner plates 2 and 2ª towards one another to engage the flanges 3 of the channel member, so that chatter or rattle, due to play between the said plates and the flanges of the guide channel, is prevented. If desired, coiled springs or spring washers may be substituted for the rubber washers.

Having fully described my invention, what I desire to claim and secure by Letters Patent is:—

1. Guide means for sliding seats comprising a runner bar, a guide channel engaged by the runner bar, said guide channel having inturned flanges overhanging the side portions of the runner bar, a non-slidable floating bearer plate loosely located within the channel adjacent the runner bar, and elastic means in a state of compression disposed within the guide channel between the bottom of said channel and the bearer plate, said elastic means pressing on the bearer plate and causing the latter to press the runner bar upwardly against the inturned flanges of the guide channel.

2. Guide means for sliding seats comprising a runner bar, a guide channel engaged by the runner bar, said guide channel having inturned flanges overhanging the side portions of the runner bar, a bearer plate loosely located within the channel adjacent the bearer plate, upstanding sleeves fixed in the bottom of the channel for the reception of fixing screws, said sleeves extending through holes in the bearer plate, and elastic means disposed in a state of compression between the bottom of the channel and the bearer plate and pressing on said bearer plate to cause it to press the runner bar against the flanges of the guide channel.

3. Guide means for sliding seats comprising a runner bar, a guide channel engaged by the runner bar and having inturned flanges overhanging the runner bar, and a rubber member disposed in a state of compression in the guide channel so as to press the runner bar against the guide channel flanges.

4. Guide means for sliding seats comprising a runner bar, a guide channel engaged by the runner bar and having inturned flanges overhanging the runner bar, a non-slidable floating bearer plate loosely located within the channel, and a rubber member maintained in a state of compression within the bottom of the guide channel and pressing on the bearer plate to cause the latter to press the runner bar against the overhanging flanges of the guide channel.

5. Guide means for sliding seats comprising a runner bar, a guide channel engaged by the runner bar and having inturned flanges overhanging the runner bar, a non-slidable floating bearer plate loosely located within the channel, and metallic springs located within the guide channel and acting on the bearer plate to cause the latter to press the runner bar against the overhanging flanges of the guide channel.

6. Guide means for sliding seats comprising a guide channel having inturned flanges, a top runner bar engaging the top faces of the flanges, a lower runner bar located within the guide channel and engaging beneath the overhanging flanges, shanks depending from the top runner bar and upon which the lower bar can slide, abutments on the lower ends of the shanks, and a resilient device maintained in compression on each shank and tending to cause the inturned flanges to be gripped between the two runner bars.

ARTHUR SAM CHESTON.